April 29, 1952 E. R. SITTON 2,594,508
LAWN EDGER
Filed Feb. 7, 1948
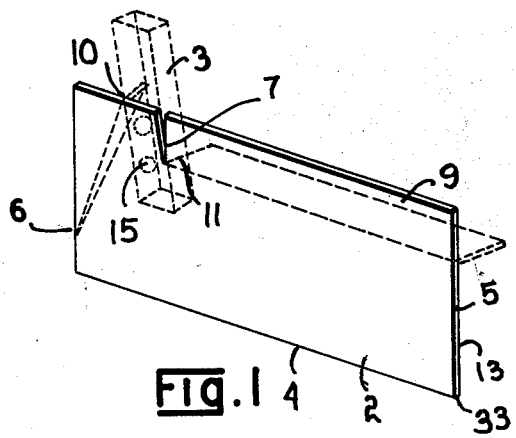
ELBERT R. SITTON
INVENTOR.
BY Lester B. Clark
a Ray L. Smith
ATTORNEYS

UNITED STATES PATENT OFFICE 2,594,508

LAWN EDGER

Elbert R. Sitton, Houston, Tex.

Application February 7, 1948, Serial No. 7,023

2 Claims. (Cl. 30—315)

The invention relates to a lawn edger for trimming sod adjacent sidewalks, driveways and the like.

An object of the invention is to provide a lawn edger for trimming the sod adjacent sidewalks, driveways, and the like, which can be readily manufactured and is of a simple design.

Another object of the invention is to provide a construction of a lawn edger which is operable by placing the weight of the operator upon the lawn edger and pushing it downwardly into the ground while simultaneously pushing it forward to trim a length along the walk.

A further object of the invention is to provide a lawn edger which comprises only a shaped blade and a handle attached thereto, whereby a minimum number of moving parts are provided in the construction so as to lessen the replacement cost of such edger.

A still further object is to provide a lawn edger construction wherein a force is applied at one point on the edger and the edger then moved about such point as a fulcrum to cut sod adjacent sidewalks or the like.

Other objects and advantages of the invention will become more readily apparent from the following description and drawing, wherein:

Fig. 1 is a perspective view of a blank showing in dotted lines the steps to be taken to form the finished edger.

Fig. 2 is an end view of Fig. 1.

Fig. 3 is an end view illustrating an embodiment of the invention.

Fig. 4 is a perspective view more clearly illustrating the construction of the edger shown in Fig. 3.

Fig. 5 is a perspective view showing the preferred embodiment of the edger, and, Fig. 6 is an end view of the embodiment shown in Fig. 5.

Fig. 7 is a side elevation showing the edger as it is operated to begin edging while the dotted lines illustrate the final position of the edger after making a cut.

In Fig. 1 the edger is shown as comprising a blade 2 secured to a handle 3. The blade 2 is formed preferably of a piece of rectangular thin metal, which comprises the bottom edge 4, the front edge 5 and the rear edge 6. In order to attain the desired shape of the blade it is slit at 7 a spaced distance from the rear edge 6 and such slit extends down into the blade far enough so that the portion 9 between the slit 7 and the front edge 5 may be folded over at slightly more than 90° with respect to the blade 2 to form a foot rest.

The rear edge 6 of the blade 2 is folded over in the same direction as is the portion 9 and it tapers upwardly to a point 10 somewhat spaced from the point 11 on the footrest 9. The handle 3 is arranged to be secured to the back surface 13 of the blade 2 fitting between the folded rear edge 10 and the footrest 9. The handle preferably contacts the rear edge at the point 10 and the footrest at the point 11 whereby the handle is rigidified or locked in position when it is secured on to the blade by suitable means such as the bolts 15.

In the construction shown in Fig. 3 the bottom edge of the blade is shown as being inclined as at 16 and having the cutting edge 18 thereon. It is to be noted that the inclination at 16 is towards the rear surface 13 and away from the front surface 20 of the blade 2 which passes adjacent the edge of the sidewalk or driveway being trimmed. The cutting surface is thereby protected from coming in contact with the driveway or sidewalk and such construction serves to protect the blade and keep it sharper for a longer period of time. As best illustrated in Fig. 3 the footrest 9 is bent at slightly more than 90° so that application of pressure on to the footrest applies such pressure in a substantially straight line downwardly through the cutting edge 18. If it is desired, the cutting edge 18 may be in the same vertical plane as is the blade 2 as illustrated in Fig. 2. The preferred arrangement is shown in Fig. 5 wherein the blade portion 26 immediately below the footrest 9 is inclined towards the front surface 20, the portion 26 is substantially at the same inclination all along the blade, but such tapered portion 26 is wider at the front edge 5 than along the slit 7. This is shown in Fig. 5 more clearly by the line 27. This, in effect, places the footrest somewhat more directly over the remainder of the blade 2 so that when pressure is applied to the footrest it is transmitted in a more direct line to the cutting edge 18 on the blade 2.

The handle 3 which is secured so that it abuts the footrest 9 and the folded rear edge 6 extends upwardly a suitable distance such as 3 or 4 feet and leans toward the rear edge 6 of the edger as shown at 30 in Fig. 7.

In the operation of the invention, which is best illustrated in Fig. 7, the operator 31 will grasp the handle 3 adjacent the top 32 thereof. The front corner 33 of the blade is inserted adjacent the sidewalk or driveway being trimmed. The operator then places his foot upon the footrest and applies pressure so that the blade moves downwardly into the ground. As the operator applies pressure on the footrest 9 the edger is pivoted forwardly as illustrated in dotted line, whereupon the whole of the blade 2 moves downwardly into the sod so as to trim the grass adjacent the sidewalk or driveway. It is to be noted that the construction herein disclosed provides a device in which a force is applied at one point while the edger is moved about such pressure point as a fulcrum. To this end it is desirable that the handle 3 be placed a spaced distance from the fulcrum so that the maximum amount of cutting leverage may be applied to the blade as it is moved forward. It is therefore necessary that the handle be rigidly secured in place and maintain its position over an extended period of use. Since the footrest 9 and the folded edge 6 abuts the handle both of these portions of the blade tend to help lock the handle in position to keep it from working loose of the bolts 15.

It seems obvious from the foregoing that a construction of a lawn edger is provided which can be easily manufactured and which is easy to use in operation. The edger may be used either on circular or straight drives.

Broadly, the invention contemplates a lawn edger and in particular a lawn edger which has a minimum number of wearing parts and which can be readily manufactured.

What is claimed is:

1. A lawn edger for trimming sod adjacent sidewalks including a planar blade, said blade having a front and rear surface thereon, a handle rigidly secured to said rear surface of said blade and extending upwardly from said blade, said handle being inclined with respect to the vertical in alignment with said blade, the lower edge of said blade being a cutting edge, the upper edge of said blade being vertically slit a spaced distance from the rear edge of the blade and directly in line with the front edge of the handle to form two upper portions of the blade, the front portion extending laterally of the vertical plane of said blade at an angle of substantially 90° and away from said front surface and toward the said rear surface to form a foot rest, said foot rest abutting one side of said handle, the rear portion of said blade being folded out of the plane of the blade until the top edge of said rear portion abuts said handle on the opposite side from said foot rest whereby said handle is locked in position on said blade between said foot rest and said rear portion of the blade.

2. A lawn edger as specified in claim 1, in which the longitudinal center line of said foot rest lies substantially in the same vertical plane as said blade.

ELBERT R. SITTON.

REFERENCES CITED

The following references are of record in the file of this patent:

UNITED STATES PATENTS

| Number | Name | Date |
| --- | --- | --- |
| 1,638,807 | Hopwood | Aug. 9, 1927 |
| 1,931,349 | Habig | Oct. 17, 1933 |
| 2,503,757 | Morgan | Apr. 11, 1950 |